Aug. 15, 1950   A. G. KROCKER   2,519,141
WEATHER STRIP
Filed April 12, 1945
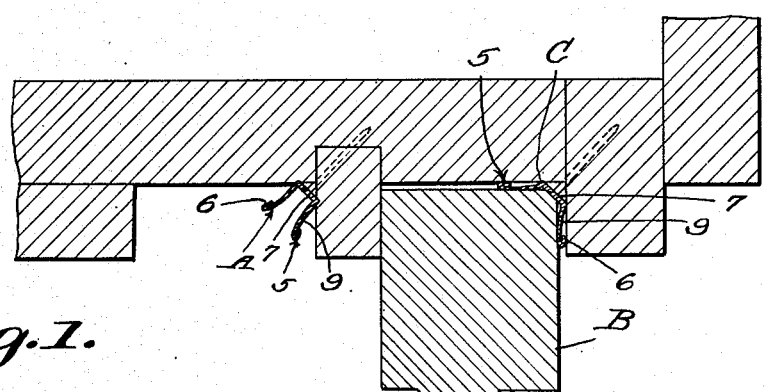
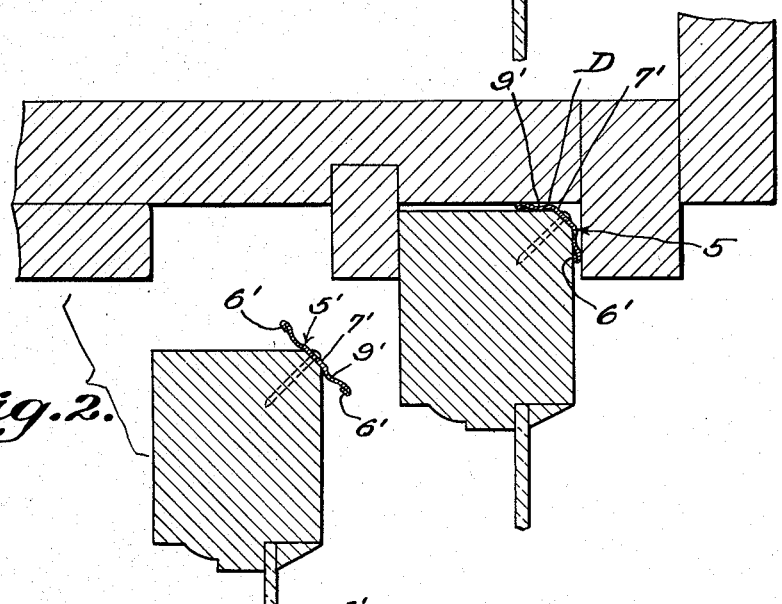
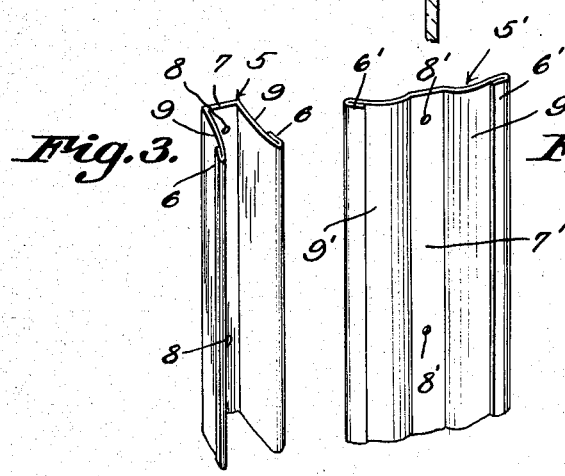
A. G. Krocker
INVENTOR.
BY
ATTORNEYS.

Patented Aug. 15, 1950

2,519,141

UNITED STATES PATENT OFFICE 2,519,141

WEATHER STRIP

Adolf G. Krocker, Waco, Tex.

Application April 12, 1945, Serial No. 587,894

1 Claim. (Cl. 20—69)

This invention relates to weather strips, designed primarily for use with sliding closures.

An important object of the invention is to provide a weather strip of this character which will not only render closures air-tight to exclude the elements, but will provide means for preventing rattling of the closure within its frame, due to wind pressure.

Another object of the invention is to provide a weather strip which may operate with equally as good results when secured to the closure, as when the weather strip is secured within the closure guide.

Still another object of the invention is to provide a weather strip which may be readily and easily installed by persons unfamiliar with mechanics, and without the necessity of making alterations in the sash or frame construction, to position the weather strip.

While the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 1 is a transverse sectional view through a sliding closure frame, illustrating a weather strip constructed in accordance with the invention, and positioned therein.

Figure 2 is a sectional view through a closure frame and closure, illustrating the strip as secured to the closure and contacting with the closure guide in providing an air-tight connection between the closure and guide.

Figure 3 is a perspective view of the weather strip illustrating the sides of the weather strip as disposed in parallel spaced relation with respect to each other.

Figure 4 is a perspective view illustrating the form of the weather strip as shown by Figure 2 of the drawing.

Referring to the drawing in detail, the weather strip as shown by Figure 1 of the drawing, is indicated by the reference character 5 and is constructed preferably of thin sheet metal material, the longitudinal edges thereof being folded outwardly and pressed into engagement with the main portion of the body, reenforcing the edges of the strip, and at the same time providing a smooth edge to reduce wear between the closure and its guide, to the minimum. The outwardly folded edges of the body are indicated by the reference character 6.

Extending longitudinally of the body portion of the weather strip, and arranged intermediate the side edges thereof, is a wide substantially straight nailing strip 7 which is formed with openings 8 through which securing nails are extended in securing the weather strip in position. The edge of the closure with which the weather strip is used, is flattened to fit the nailing strip 7, as clearly shown by the drawing, to insure the weather strip being held in its proper position against displacement, when the closure is being moved within its guide.

The portions of the weather strip between the nailing strip 7 and outwardly turned longitudinal edges thereof, are curved as at 9 lending resiliency to the weather strip to cause the outer edges of the weather strip to closely engage the sash guide or sash, depending on the manner of positioning the weather strip.

As shown by Fig. 1 of the drawing, the weather strip is positioned within one corner of the sash guide, and the normal position of the strip when used in this manner, is indicated at A. When the sash, which in the present showing is indicated by the reference character B, is positioned in the guide and the corner of the sash is disposed between the flanges of the weather strip, the flanges of the weather strip will be bent laterally to the position as shown by Fig. 1 of the drawing and indicated at C, the edges of the weather strip being in close engagement with the wall of the guide, at one corner of the guide.

When the weather strip is to be carried by the sash, as shown by Fig. 2 of the drawing, the form of weather strip as shown by Figure 4 of the drawing, and including the body portion 5', is positioned over one corner of the sash with the nailing strip 7' thereof engaging the corner of the sash. The nails are now driven through the openings 8' to secure the strip in position. In this form of the invention, the flanges are also curved at 9' and the longitudinal edges of the flanges are bent inwardly providing smooth outer curved guide engaging edges. It will be obvious that after the weather strip has been positioned on the sash and the weather strip placed within its guide, the weather strip will take the position as shown at D in Fig. 2 of the drawing. Thus it will be seen that due to this construction, the flanges forming a part of the weather strip, will be held into close engagement with the sash and wall of the guide, providing an air-tight connection and at the same time exerting a pressure on the sash to insure against the rattling of the sash under wind pressure.

What is claimed is:

The combination with a sash and sash guide, the sash having one of its outer corner edges beveled, providing a flat surface of a weather strip comprising a wide body having a central longitudinal flat nailing section secured to the flat surface of the sash, the portions of the body of the weather strip beyond both side edges of the nailing section being flexible and curved longitudinally, lending resiliency thereto, providing yieldable sealing strips between the sash and sash guide at the outer corners of the sash, forcing the opposite side of the sash into close engagement with the sash guide.

ADOLF G. KROCKER.

REFERENCES CITED

The following references are of record in the file of this patent:

UNITED STATES PATENTS

| Number | Name | Date |
|---|---|---|
| 821,261 | Shellaberger | May 22, 1906 |
| 1,552,842 | Hoffbauer | Sept. 8, 1925 |
| 1,621,508 | Holt | Mar. 22, 1927 |
| 2,172,580 | Hettinger | Sept. 12, 1939 |

FOREIGN PATENTS

| Number | Country | Date |
|---|---|---|
| 731,453 | France | of 1932 |
| 112,095 | Australia | of 1940 |